Dec. 31, 1968  R. F. E. WINN  3,419,784
MAGNITUDE-TO-FREQUENCY CONVERTERS
Filed Dec. 5, 1966  Sheet 1 of 2

INVENTOR
ROGER FREDERICK EDWARD WINN
BY
ATTORNEY

United States Patent Office 3,419,784
Patented Dec. 31, 1968

3,419,784
MAGNITUDE-TO-FREQUENCY CONVERTERS
Roger F. E. Winn, London, England, assignor to Elliott Brothers (London) Limited, London, England, a British company
Filed Dec. 5, 1966, Ser. No. 599,221
5 Claims. (Cl. 321—8)

ABSTRACT OF THE DISCLOSURE

A circuit is shown comprising an integrator for integrating the input voltage, and a comparator for comparing the output of the integrator with a reference. The comparator is switched to produce an output at one level when the output of integrator equals the reference and immediately closes switches to reduce the output of the integrator towards zero and to reduce the reference. When the output from the integrator equals the reduced reference, the output of the comparator changes to a new level.

---

The invention relates to voltage (or other magnitude) to frequency converters.

According to the invention, there is provided an electrical circuit for producing an output signal having a frequency dependent on the magnitude of an input signal, comprising integrating means operative, when activated, to produce an integrated output dependent on the integral of the input signal, and output means responsive to the integrated output from the integrating means and operative to deactivate the integrating means when the said integrated output reaches a first predetermined level whereby the output from the integrating means changes, and operative to activate the integrating means when the output from the integrating means reaches a second predetermined level, the output means being arranged to produce an alternating output constituting the said output signal and having a first value when the integrated means is activated and a second value when the integrating means is de-activated.

According to the invention there is also provided an electrical circuit for producing an output signal having a frequency dependent on the magnitude of an input signal, comprising integrating means, first switch means controlling the integrating means whereby in one position of said first switch means the integrating means produces an integrated output dependent on the integral of the input signal and in the other position of the first switch means the output of the integrating means tends to zero, reference means energisable to provide a reference signal, second switch means connected to control the level of the reference signal whereby in one position of the second switch means the reference signal has a first predetermined value and in the other position of the second switch means the reference signal has a second predetermined value, and comparing means operative to compare the output from the integrating means with the value of the reference signal, the comparing means being switchable between two states in which it respectively produces different output levels and being arranged to be switched into one said state when the output from the integrating means becomes equal to the first predetermined value of the reference signal and being arranged to be switched into the other said state when the output from the integrating means becomes equal to the second predetermined value of the reference signal, the two said switch means being controlled in dependence on the output of the comparing means whereby each switch means is switched between its two positions when the output from the comparing means changes from one said level to the other said level.

Different forms of a voltage to frequency converter embodying the invention will now be described by way of example and with reference to the accompanying drawings, in which.

Figure 1:
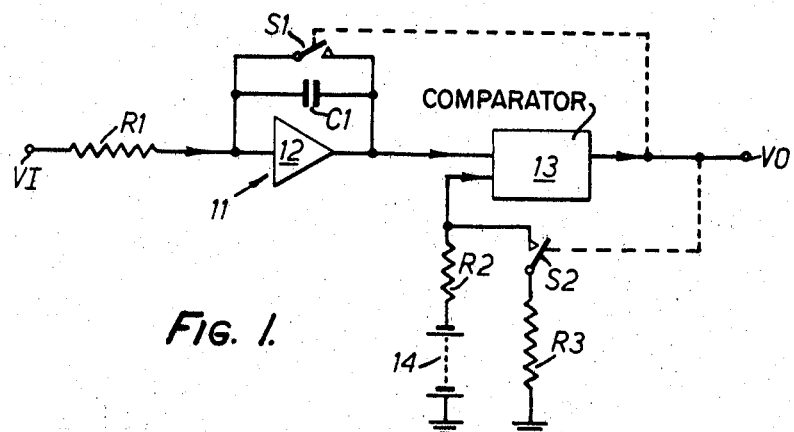
FIGURE 1 shows a block schematic circuit diagram of one form of the voltage to frequency converter.
Figure 3:
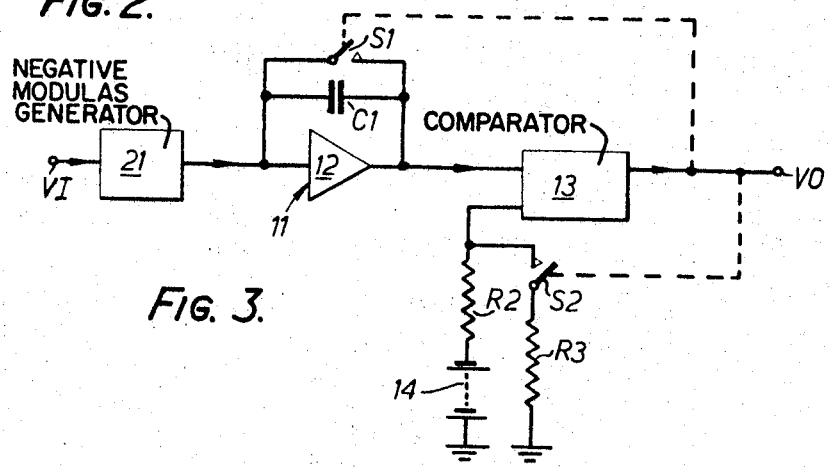
Figure 4:
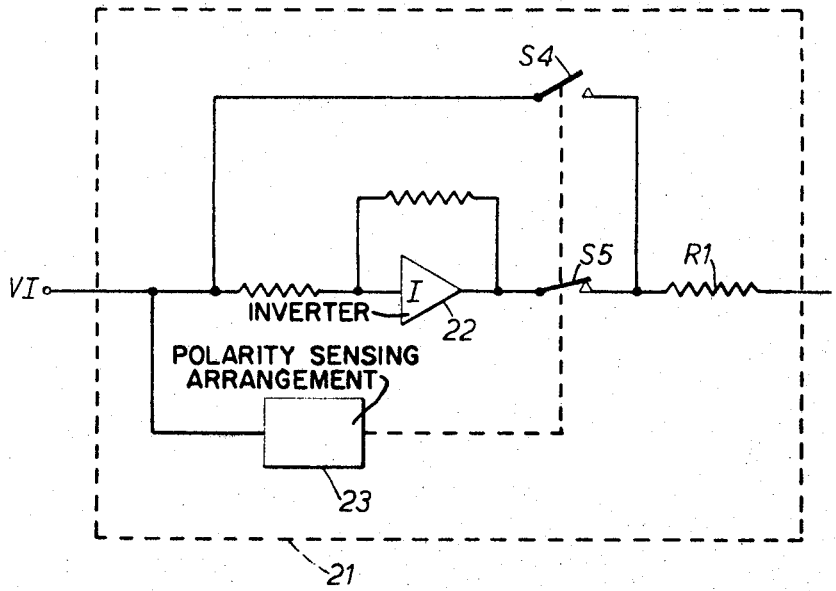

FIGURE 3 shows a block schematic circuit diagram of a further form of the voltage to frequency converter, this form again being similar to that of FIGURE 1 but including further means whereby the output of the converter is the same irrespective of the polarity of the input voltage; and FIGURE 4 is a circuit diagram of the means in FIGURE 3 whereby the output is the same irrespective of the polarity of the input voltage.

The voltage to frequency converter (FIGURE 1) comprises an input terminal VI connected via a resistor R1 to the input of an integrator 11. The integrator 11 comprises a D.C. operational amplifier 12 having a capacitor C1 connected in parallel therewith. Connected in parallel with the capacitor C1 and the amplifier 12 is a switch S1.

The output from the integrator 11 is fed as one input to a comparator 13 whose output is connected to an output terminal VO and is also connected to control operation of the switch S1.

A further input from the comparator 13 is derived from a voltage source 14 via a resistor R2. The resistor R2 at its end remote from the voltage source 14 is connected via a switch S2 through a resistor R3 to earth. The switch S2 is arranged to be controlled by the output of the comparator 13.

In operation, a D.C. voltage which is to be converted into a signal having a frequency proportional thereto is fed via the input terminal VI and resistor R1 to the integrator R1 to the integrator 11. At this time both the switches S1 and S2 are in their open condition as shown in FIGURE 1. As the integrator charges so the output therefrom to the comparator 13 increases in magnitude and when it reaches the magnitude of the reference voltage fed from the voltage source 14 to the comparator 13 the output from the comparator 13 changes its value. This change in the value of the output from comparator 13 causes the switch S2 to close so including a resistor R3 in the reference voltage circuit to reduce the value of the reference voltage signal applied to comparator 13. At the same time the output from comparator 13 causes the switch S1 to close so allowing the integrator circuit to discharge causing a reduction of the input therefrom to the comparator 13. When the input to the comparator 13 from the integrator 11 reaches the value of the lower reference voltage the output from the comparator 13 reverts to its original value. This new output value from the comparator 13 allows the switches S1 and S2 to open so causing the integrator 11 to commence to charge up again and increasing the reference voltage input to the comparator 13 to its higher value. This cycle of events continues with a pulse output being produced from the comparator 13 whose repetition frequency is governed by the charging and discharging of the integrator circuit which in turn is governed by the value of the D.C. input voltage to the input terminal VI.

Figure 2:
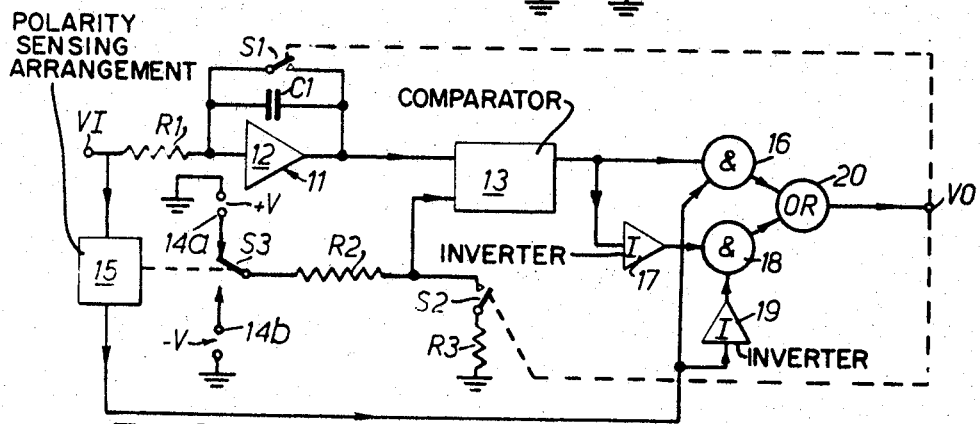
FIGURE 2 shows a block schematic circuit diagram of another form of the voltage to frequency converter, this form being similar to that of FIGURE 1 but including means whereby the output of the converter is the same irrespective of the polarity of the input voltage thereto.

In the voltage to frequency converter of FIGURE 2 the input terminal VI is, in addition to being connected to the resistor R1, also connected to the input of an arrangement 15 capable of sensing the polarity of the input voltage applied to terminal VI. The arrangement 15 is arranged to control a switch S3 so as to connect a positive reference voltage source 14a to resistor R2 when the input to terminal VI is negative and to connect a negative reference voltage source 14b to resistor R2 when the input voltage to input terminal VI is positive.

The output from comparator 13 is connected directly as one input to an AND gate 16 and via an inverter 17 as one input to an AND gate 18. The output from the arrangement 15 is connected directly to provide a further input for AND gate 16 and via an inverter 19 to provide a second input for AND gate 18. The outputs from AND gates 16 and 18 are fed as inputs to an OR gate 20 whose output is connected to the output terminal VO. In this arrangement the switches S1 and S2 are controlled according to the signals appearing at output terminal VO rather than by the output appearing directly from the comparator 13.

The operation of this circuit is identical to that of FIGURE 1 except that the arrangement 15 provides, by means of switch S3, a positive or negative reference voltage input to comparator 13 according to the polarity of the input voltage at input terminal VI. With a positive input voltage being applied to input terminal VI the output from comparator 13 to AND gate 16 will be a series of positive going pulses and the output from arrangement 15 to AND gate 16 will be positive. Hence an output from AND gate 16 will pass through OR gate 20 to output terminal VO. The outputs from comparator 13 and arrangement 15 via inverters 17 and 19 respectively to AND gate 18 will be negative and therefore no output will be produced from AND gate 18. When a negative voltage is applied to input terminal VI the output from comparator 13 will be a series of negative going pulses and will pass through inverter 17 to produce a positive input for AND gate 18. Similarly, the output from arrangement 15 will be negative and will pass through inverter 19 to provide a positive input to AND gate 18. Hence an output from AND gate 18 will pass through OR gate 20 to terminal VO, the pulses reaching VO being positive going as in the previous case with a positive input voltage to input terminal VI. The outputs from comparator 13 and arrangement 15 which pass to AND gate 16 are in this case both negative and so no output will be passed therefrom to the OR gate 20. The arrangement 15 may comprise a D.C. operational amplifier connected to receive the input voltage at its non-inverting input, its inverting input being earthed. It will be appreciated that the arrangement 15 can be designed to produce an output whose polarity is opposite to the polarity of the input signal, instead of having the same polarity, appropriate modifications being made to the remainder of the circuit of FIGURE 2: if, in such a case, the arrangement 15 were a D.C. operational amplifier then the input voltage would be applied to its inverting input while the non-inverting input would be connected to earth. The voltage to frequency converter of FIGURE 3 is similar to that shown in FIGURE 1 except that there is inserted between input terminal VI and the integrator 11 a negative modulus generator 21. The negative modulus generator 21 produces a negative voltage output irrespective of the polarity of the input voltage applied thereto. The operation of the remainder of the circuit is identical to that described for FIGURE 1.

The negative modulus generator 21 may have the form shown in FIGURE 4 which comprises two parallel-connected circuit paths respectively controlled by switches S4 and S5, the path controlled by the switch S5 including an inverter 22. The switches S4 and S5 are controlled by a polarity sensitive arrangement 23 which is similar in operation and may be similar in construction to the arrangement 15 in FIGURE 2. If the input voltage applied to the terminal VI is positive, the arrangement 23 maintains the switch S4 closed and the switch S5 open so as to pass the input signal through resistor R1 to the integrator 11 unchanged. If the input signal is negative, on the other hand, the arrangement 23 opens the switch S4 and closes the switch S5 so as to pass the input signal to the resistor R1 through the inverter 22 which inverts the input signal so as to give it a positive sign. Hence the input to the integrator 11 is always positive regardless of the polarity of the input signal applied to the terminal VI.

All the embodiments disclosed herein produce a ramp voltage from integrator 11, the upper and lower limits of which are both defined thus providing linearity of voltage to frequency conversion characteristic.

What is claimed is:
1. An electrical circuit for producing output signals having a frequency dependent on the magnitude of an input signal, comprising
   integrating means having an input and an output,
   means connecting the input to be responsive to said input signal whereby the integrating means is operative, when activated, to produce at its said output an intermediate signal dependent on the integral of the input signal,
   reference means producing a reference signal and which includes two-state switch means operable to change the value of the reference signal between a first predetermined value and a second predetermined value,
   comparing means connected to compare the intermediate signal with the reference signal and operative to produce a first output signal when the intermediate signal reaches the first predetermined value of the reference signal and a second output signal when the intermediate signal reaches the second predetermined value of the reference signal,
   means interconnecting the integrating means and the comparing means whereby occurrence of the first output signal from the comparing means de-activates the integrating means and occurrence of the second output signal from the comparing means activates the integrating means, and
   means connecting the switch means for operation by the comparing means whereby occurrence of the first output signal from the comparing means changes the value of the reference signal from the first predetermined value to the second predetermined value and occurrence of the second output signal from the comparing means changes the reference signal from the second predetermined value to the first predetermined value.

2. A circuit according to claim 1, in which the integrating means includes
   capacitive means connected between the said input and the said output and arranged to be charged in dependence on the said input signal,
   a discharge path for the capacitive means, and
   switch means connected to control the discharge path, the switch means being controlled by the said output means whereby to discharge the said capacitive means when the said intermediate signal reaches the said first predetermined level.

3. A circuit according to claim 1 including means rendering the output signal independent of the sign of the input signal comprising modulus generator having an input connected to receive the said input signal and an output at which is produced a signal having a magnitude proportional to the magnitude of the input signal and a sign which is the same irrespective of the sign of the input signal, and means connecting the output of the modulus generator to the input of the integrating means.

4. A circuit according to claim 3, in which the modulus generator comprises means providing two parallel-connected circuit paths, a respective switch in series with each said circuit path, inverting means in one said circuit path in series with the said switch therein, and polarity sensitive means arranged to be responsive to the polarity of the input signal and connected to control said switches, the polarity sensitive means being operative to open one said switch and to close the other said switch when the input signal has one polarity and operative to open the other said switch and close the said one switch when the input signal has the opposite polarity.

5. An electrical circuit for producing output signals having a frequency dependent on the magnitude of an input signal, comprising
  integrating means having an input and an output,
  means connecting the input to be responsive to said input signal whereby the integrating means is operative, when activated, to produce at its said output an intermediate signal having a value and polarity respectively dependent on the integral and polarity of the input signal,
  reference means operative to produce a reference signal,
  polarity control means connected to the reference means and operative to control the polarity of the reference signal,
  switch means operable to change the value of the reference signal between two predetermined values,
  comparing means connected to the output of the itegrating means and operative to compare the said intermediate signal with the reference signal, the comparing means being responsive to the said intermediate signal thereat to de-activate the integrating means when the said intermediate signal reaches a first one of the predetermined values of the reference signal so that the intermediate signal from the integrating means changes and being responsive to the intermediate signal to activate the integrating means when the intermediate signal from the integrating means reaches the second one of the predetermined level values of the reference signal, the comparing means having an output at which is produced an output signal dependent on the said comparison and means connecting the switch means to be controlled by the comparing means whereby the reference signal has one said predetermined value when the integrating means is activated and has the other said predetermined value when the integrating means is de-activated,
  polarity sensitive means connected to the said polarity control means and responsive to the polarity of the input signal to control the polarity of the reference signal in dependence on the polarity of the input signal whereby the polarity of the output signal from the comparing means is dependent on the polarity of the input signal,
  output terminal means,
  first and second two-input AND gates,
  an OR gate connected to the outputs of the AND gates,
  first and second inverting means respectively connected to the two inputs of said first AND gate,
  means connecting the output of the comparing means to one said input of the said second AND gate and to the said first inverting means,
  means connecting the other said input of the said second AND gate to the polarity sensitive means to receive a signal having a polarity dependent on the polarity of the input signal,
  means connecting the said second inverting means to the polarity sensitive means to receive the said signal having a polarity dependent on the polarity of the input signal, and
  means connecting the output of the OR gate to the said output terminal means.

References Cited

UNITED STATES PATENTS

| | | | |
|---|---|---|---|
| 2,994,825 | 8/1961 | Anderson | 324—120 X |
| 3,022,469 | 2/1962 | Bahrs et al. | 307—106 X |
| 3,169,233 | 2/1965 | Schwartz | 307—88.5 |
| 3,245,004 | 4/1966 | Anderson et al. | 307—88.5 |
| 3,251,052 | 5/1966 | Hoffman et al. | 340—347 |
| 3,256,426 | 6/1966 | Roth et al. | 328—127 X |
| 3,274,501 | 9/1966 | Heinsen | 307—88.5 |
| 3,327,229 | 6/1967 | Huelsman | 324—120 X |

JOHN F. COUCH, *Primary Examiner.*

G. GOLDBERG, *Assistant Examiner.*

U.S. Cl. X.R.

307—108, 151, 229, 271; 328—127, 141; 340—347